Aug. 13, 1935.    K. RÄNTSCH    2,011,263
DEVICE FOR WORKING WITH LENTICULATED FILMS
Filed Sept. 23, 1932
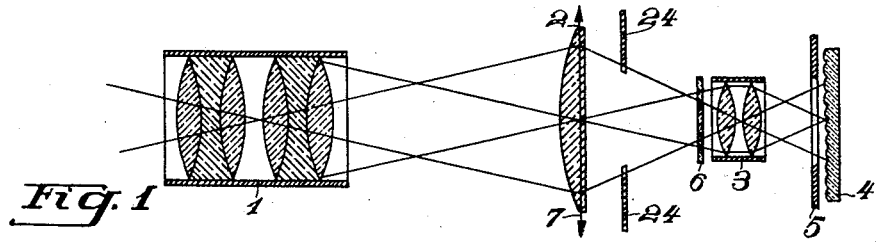
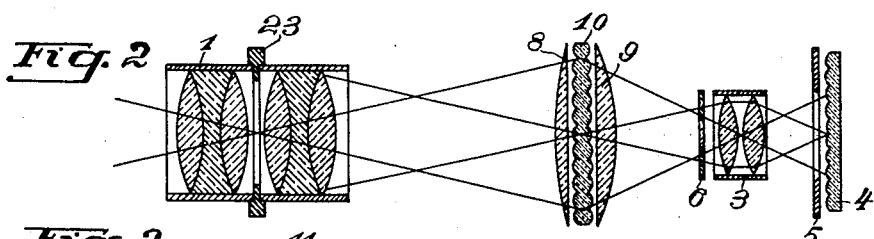
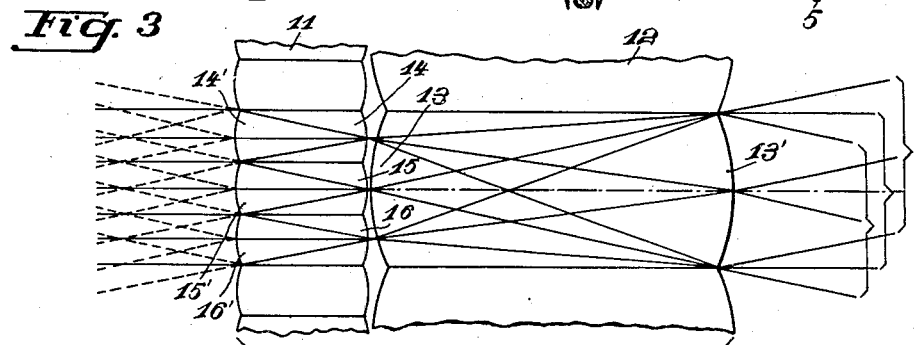
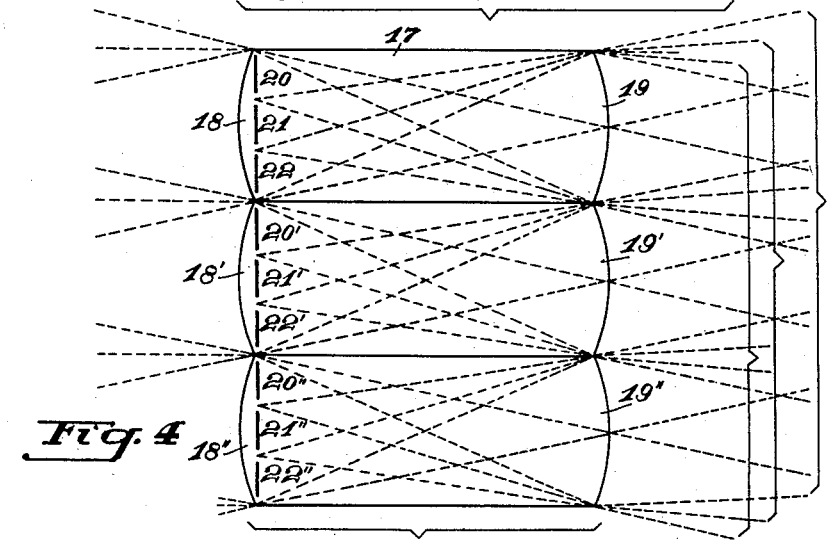
INVENTOR
Kurt Räntsch
BY
ATTORNEYS Patented Aug. 13, 1935

2,011,263

UNITED STATES PATENT OFFICE 2,011,263

DEVICE FOR WORKING WITH LENTICULATED FILMS

Kurt Räntsch, Teltow-Seehof, near Berlin, Germany, assignor to Siemens & Halske Aktiengesellschaft, Siemensstadt, near Berlin, Germany, a corporation of Germany Application September 23, 1932, Serial No. 634,529
In Germany September 23, 1931

6 Claims. (Cl. 95—2)

This invention relates to a new device for the working with lenticulated films. These devices may be suitable both for taking and projecting images on lenticulated films.

An advantage of the new device is that the images taken and projected by means of it are completely free from coloured shades at the borders of strictly limited objects lying outside the focussing plane of the taking and projecting objectives and from colour dominants occurring at the borders of the image.

The invention consists in the use of two objectives of which in the taking process the first projects a plane image which is not decomposed according to the colours and of which the second images this plane image on the film thereby decomposing it into the different fundamental colours. In the projection process it is the reverse: The film is imaged into a plane thereby retro-constituting the colours and this plane image is projected on the screen.

Constructional examples of the new devices are shown in the figures.

Figs. 1 and 2 show the section through two complete taking devices.

In Figs. 3 and 4 two different constructional examples forming a component part of the device according to Fig. 2 are shown in section.

In Fig. 1 the front or primary objective 1 projects an image of the object to be taken into the plane 2. This image is projected by the rear or secondary objective 3 on the film 4 which is placed behind the threading gap. If the lenticulated film serves for the production of images to be projected in colours, provision may be made for the colour filter 6 between the plane 2 and the film 4. A lens 7 is, in addition, placed in the plane 2 which images the rear aperture of the front objective into the front aperture of the rear objective.

It is well-known that objectives used in connection with lenticulated elements must have a well-defined angular aperture which is in accordance with the angular opening of the lenses on the film. At least the diaphragm or the colour filter must fulfill this condition or a similar one replacing it. This angular aperture must in general be very large, since, on the one hand, the colour filters absorb much light which necessitates the use of objectives having large angular apertures and, on the other hand, the lenticular elements cannot be decreased too much, on account of the difficulty encountered in their manufacturing process. In addition, certain conditions should be observed which must be met with by the situation of the filter image viewed from the film. This image must in general lie in infinity. In order to obtain sufficient sharp images from those objects, lying behind or in front of the midst of the taken scene a small diameter is required for the objective and consequently a small focal distance. When pictures are taken on lenticulated films, it is of great importance to have very sharp images of all objects, as coloured shades may be seen at the images of those objects which are lying too near or too far from the taking objective, so that their images are lacking of sharpness. The elimination of said colour shades is particularly desirable. Finally the conditions imposed on the objective relative to the mutual situation of the effective diaphragm plane and the colour filter and on the freedom from cat's-eye effects must be fulfilled. It is extremely difficult to fulfill all these conditions simultaneously by means of one objective.

The advantage obtained by the invention is that the functions are sub-divided and imparted to two objectives. If, for instance a diffusing surface of great fineness is placed in the image plane 2, it must only be required from the front objective that it projects a sharp, bright image, whereas the second objective may have a great opening, as it only images one plane on another. Its focal distance can therefore be chosen great, which considerably facilitates the construction of this objective. Its aperture and size must be adapted to the angular opening of the lenticular elements. In addition, the colour filter placed between the real image projected by the front objective and the lenticulated film must be arranged in such a manner that its image viewed from the film lies at the required distance and that the objective works without cat's-eye effects. The colour filter is preferably placed at the focal point of that objective which is lying between the diffusing surface and the film.

The light diffusion due to the diffuse areas present in the plane of the image projected by the first objective can be of different intensity. In general the diffusion light cone emanating from a point of the diffusing area is illuminated in such a manner that the greatest intensity is present in the extension of the direction of the incident light rays and that this intensity gradually decreases in the directions departing therefrom. If stress is laid on eliminating the coloured shades occurring owing to the lacking sharpness of depth effects, a surface should be used which produces a large diffusion-light-cone which is uniformly illuminated. This gives however rise to a great loss in light. The cone can be decreased by the use of another surface which involves a reduction of the light-loss, but enables coloured shades to be set up. If the formation of coloured shades is not to be expected or if they can be eliminated by other means, the diffusing surface can be dispensed with. Provision can, for instance, be made outside the diaphragm planes of the two objectives for a diaphragm 24 which may be shaped as a diaphragm of linear limitation and run parallel to the directions of the filter zones. A suitable adjustment of this diaphragm enables the dominants to be symmetrically distributed, so that they are scarcely noticeable and can be completely eliminated by an adequate filter dimensioning.

Instead of the diffusing transparent surface, use can also be made of an opaque one. The rays emanating from the image produced on this surface must then be reflected on to the objective imaging the surface on the film by means of suitable mirror or prism systems.

As diffusing surface for absorbing the image projected by the first objective, use can be made of a surface of great fineness or of a suitably lenticulated film. The lenticulations of this film have preferably such angular openings as modify the relative aperture of the light cone emanating from the front objective in such a manner that the aperture coincides with the angular opening at which the second objective is viewed from the intermediate plane. This condition can easily be fulfilled by a suitable dimensioning of the focal length and the size of the lenticulations, to the effect that the whole of the aperture of the second objective is illuminated and no light or even a small amount of light falls on the objective fitting. In connection with a lens which may be located immediately before or behind the diffusing surface, this results in the best utilization of light.

It is of special advantage if, at the point of the real intermediate image, at least two lenticulations are provided for. These lenticulations produce images of the apertures of the front and the rear objective facing the intermediate image. The colour filter should thereby preferably coincide with the diaphragm plane of the rear objective. In order to prevent, by means of two lenticulations, the occurrence of coloured shades and colour dominants (falsifications), two essentially different methods can be employed.

The lenticulations can be designed in such a manner that for each element of the image the whole of the light, i. e. the red, as well as the green and the blue light passes through the entire aperture of the front objective which is effective for the point under consideration. If this condition is not fulfilled, normal taking apparatus give rise to colour shades. If one considers an object of the scene to be taken which does not lie in the plane of sharpness, one obtains, for each colour separately, a more precise image as in black-white takes obtained from the same objective, since for each colour a materially smaller aperture is effective. But since these apertures are adjacent to one another, the differently coloured component images of objects outside the plane of sharpness are also adjacent. If, however, care is taken, that the impression aperture is the same for the rays of each filter colour, such a fault can evidently occur neither in the taking nor in the projecting process (e. g. oblique direction of projection). Colour dominants due to the fact that part of the objective aperture is subjected to cat's-eye effects through a lens fitting are also avoided, if the effective aperture of the front objective is the same for the rays of all colours.

The lenticulations can therefore be designed at the point of the intermediate image in such a manner, that, for instance, the aperture of the front objective facing the intermediate image is imaged on each colour zone of the colour filter associated with the second objective.

A fundamentally different possibility of avoiding dominants and shades consists in that the colour filter is repeatedly imaged by the lenticulation facing the second objective into the plane in which the image is produced which has been formed by the front objective in the taking process. In this manner the image projected from the object to be taken can be itself lenticulated and sub-divided into the different colour-elements, as is the case in producing takes on autochromatic plates. These colour elements, which are the elements of the image itself, are then imaged, whereas in the normal taking process and in the taking process prescribed for lenticulated films the image elements themselves are not sub-divided into elements co-ordinated to different colours, but the aperture of the taking objective is imaged on the photographic layer.

In the above considerations, it is assumed that the new device is used for taking purposes. The considerations are naturally the same if the projection of finished images is involved.

The method of carrying the invention into effect will be explained with the aid of Figs. 2, 3 and 4.

The taking camera represented in Fig. 2, or the projection apparatus, is essentially designed as shown in Fig. 1. The intermediate image is replaced by at least two lenticulations. They are located for instance on the layer 10 which may be arranged between the lenses 8 and 9. Two constructional examples of the two lenticulations are shown in Figs. 3 and 4. In the device according to Fig. 3, two layers 11 and 12 are substituted for the intermediate image, which are fitted with lenticulations on both sides. It is assumed that the colour filter located between intermediate image and film consists of three zones of equal width.

The lenticular elements engraved on layer 11 are dimensioned so as to make their width equal to one third of the width of the lenticulations on layer 12. The two layers are arranged in such a manner that each separating edge between two lenticular elements of layer 12 coincides with a separating edge between two lenticular elements of layer 11. The lenticulations opposite to said lenticulations and engraved on the same layer are designated by 13 to 16. If layer 11 faces the front objective and layer 12 the rear objective, the lenses 14', 14, 13, 13' represent for instance a telescopic system—reversed for the taking process—which by a reduction in angle images the aperture of the front objective on a zone of the colour filter.

It is thereby furthermore assumed that the curvature of the lenses 14 and 14' is such that their focal lengths are equal to the thickness of layer 11 and that the focal lengths of the lenses 13 and 13' are in accordance with the thickness of layer 12. The focal length is thereby the distance actually measured in the layer medium 11 or 12 between the lenticular elements and the point where an infinitely distant object has been imaged.

In addition, the relative opening of the lenticulations 14', 15', 16' etc. should be made equal to the relative aperture of the front aperture, whereas the relative opening of lens 13' and the adjacent lenticulations must be equal to the relative aperture (angular opening) at which the aperture of the second objective or the colour filter is viewed from the plane of the intermediate image.

The other conditions to be imposed on the dimensions of the lenticulations are as follows: The degree of fineness obtainable in the lenticulated film record, is determined by the fineness of the lenticulation engraved on the film. If, however, the lenticular elements 13 or 13' are made greater than those of the film imaged on the plane of the intermediate image, the degree of the fineness obtainable in the record, is diminished and determined by the dimensions of the lenticular elements 13 and 13'. Hence for the dimensions of these lenses, an upper limit is given by the fact that they must not exceed the lenticulations of the film imaged into the plane of the intermediate image. If the rear objective images in the ratio 1:1, they can thus be made equal to the film lenticulations. Since, in addition, the focal length must be equal to the thickness of the layer and since finally the image of the aperture of the objective located in front of the lens must be equal to the width of the lens, the thickness of layer 12 for a given material is determined according to well-known principles. This results also in the number of the lenticulations of layer 11, and since, for the rest, the conditions for these lenses are the same as for the lenses of layer 12, we obtain definite values for the thickness of layer 11 and the curvature of the lenticular elements, if the material to be used for layer 11 has been determined. By choosing another material having other refraction exponents, the thickness of the layer and the curvature of the lenses can be modified.

If the multi-zone filter, located between the intermediate image and the film, has more than three zones or if the width of the zones is not the same, the layer 11 must be given another number of lenses or the reduction ratios of the three systems, consisting of the lenses 14', 14, 13, 13' or 15', 15, 13, 13' or 16', 16, 13, 13' are different. Lenses of different width and different curvature must thus be engraved on layer 11. The width of each lens of layer 11 must be in accordance with the image of the corresponding zone of the filter projected by lens 13'.

If now the light beam passing through the two layers 11 and 12 in the taking process is followed up in detail, the lenticulation of layer 11, say lens 15' images the emersion aperture of the front objective on lens 15. The lenses 15 and 13 image lens 15' on lens 13', which, in its turn images lens 15 into the intermediate zone of the colour filter. Hence one obtains in total an imaging of the aperture of the front objective into a zone of the colour filter, whereby the lenses 15 and 13 and, correspondingly in the adjacent systems, the lenses 14 and 13 prevent losses in light due to the imaging of the front lens of layer 11 on lens 13'.

The layer represented in Fig. 4 is a constructional example of the other principle according to which a multiple image of the colour filter is projected into the plane, in which an image of the object to be taken is projected by the front objective. Provision is only made for a layer 17 having large lenticulations 18, 18', 18'' etc. or 19, 19', 19'' etc. impressed on it at both sides.

The focal lengths of these lenses are again equal to the thickness of layer 17. In addition, the relative aperture of the lenticulations 18 facing the front objective is equal to the relative aperture of this objective and the relative aperture of lenses 19 is equal to the relative aperture of impression of the rear objective. Since the lens opening is given by the focal length and size of the lenticular elements, the front and rear objectives must also have the same aperture at the side facing the intermediate image, in order to avoid light losses or overlapping.

The function of layer 17 is such that the image projected by the front objective, is produced in the plane of the lenses 18, 18', 18''. The lenses 19, 19', 19'' etc. image the components of the image into the colour filter. If this filter again consists, say of three zones of equal width, lens 19 images part 20 representing one third of the image, of the object to be taken projected in lens 18, into one of the lateral zones of the colour filter, whereas the parts 21 and 22 equally representing each one third of the image projected in lens 18 are imaged into the intermediate and the other lateral zone respectively. The other pairs of lenses 18', 19' or 18'', 19'' are correspondingly imaged. The essential feature of the lenses 18, 18', 18'' is that they image the emersion aperture of the front objective into the lenticulations 19, 19' or 19'' lying behind it, thus avoiding losses in light. The imaging into the zones of the colour filter is effected by the lenticulations and such objective lenses as are located between intermediate image and filter. Use can, for instance, be made of the lens 9 for imaging purposes.

The above-named condition that the relative apertures of the front and rear objective must be equal in size at the sides facing the intermediate image, can be dispensed with, if, instead of using the one layer 17 of Fig. 4 the two lenticulations are located on different layers. The lenticulations can, for instance, be engraved in layers of different material to the effect that one obtains layers which are smooth on one side and lenticulated on the other side. If such layers are placed one upon the other in such a manner that the lenticulations of one are in touch with the smooth surface of the other, the focal lengths of all the lenticular elements will be equal to the thickness of the latter layer. Since, however, one of the lenticulations has been engraved in a material having another refraction index, its lenses can have another relative opening, without varying in size from the lenticular elements of the other layer. The use of two layers being smooth on one side and lenticulated on the other is, of course, also possible in the case shown in Fig. 4, in which the relative aperture of the lenticular elements is to be the same on both sides. For both lenticulations use is then made of layers having the same refraction index.

The new device is lenticulated in the plane of the intermediate image, the lenses being cylindrical, if for taking or projecting purposes lenticulated films are used whose lenses are also cylindrical. If, however, takes on films with spherical lenticulation are involved, the lenses in the plane of the intermediate image must also be spherical. On using a cylindrical lenticulation care should finally be taken that the directions of the lenticulations in the intermediate layer coincide with those of the film lenticulations.

Without special auxiliaries, the intermediate layers shown in Figs. 1 and 2 are only useful, if the apertures of the two objectives facing the intermediate image lie in infinity. With a finite situation of these apertures it is necessary to project the images of those apertures into infinity, for instance by lenses 8 and 9, for instance located immediately in front of the lenticulated layers. Thus between the front objective and the lenticulated layer a lens 8 is, for instance, placed, the focal length of which is equal to the distance between the emersion aperture of the front objective and the intermediate layer.

On using cylindrical lenses, a further improvement can be effected in that it is taken into account that the layers carrying the lenticulations have a considerable influence on the light beam, if a section is drawn which runs vertical to the direction of the lenticulation. But in case of a section through a plane parallelling the direction of the lenticulation, the layers are only noticeable as plano-parallel areas. Consequently, the two planes of sharpness do not coincide in the two directions. This fault is corrected in that—preferably between intermediate image and film—provision is made for a suitably shaped cylindrical lens which equalizes the width of the sectional area of the rear objective in the direction running vertical and parallel to the direction of the lenticular elements.

In the manufacture of the layers with different lenticulations, care must be taken that the edges of the lenticular elements are exactly opposite to one another. For this end, use can for instance be made of two layers lenticulated only on one side and placed one upon the other in such a manner that the lenticulated side of one layer is in touch with the smooth side of the other layer. After control by means of a microscope, the layers are displaced with respect to one another until the lenticular elements are exactly opposite to one another whereupon they are solidly fixed in that position. The layers themselves may be for instance of celluloid, glass or other light-reactive material. The lenticular elements are preferably engraved in the hot condition.

For producing layers lenticulated on both sides, the method used may be as follows: Two plates are equipped with a negative of the lenses to be engraved and the two lenticulations are engraved simultaneously into a layer by means of the two plates. By means of a microscope, it is checked whether the lenses are exactly opposite to one another. The two engraving plates are displaced with respect to one another, with the aid of micrometer screws, until the result of the engraving is in accordance with the desired degree of perfection. Instead of plates, use can be made in a similar manner of cylinders carrying a negative of the lenticulation to be engraved.

A special advantage of the new taking and projecting apparatus results from the fact that it is sometimes desirable, for instance when passing from close-ups to long-shots, to change the objective, which involves a filter change in the normal taking apparatus, so that each objective must have its own filter. If, however, use is made of a taking camera according to the invention, the second objective remains the same in every case; its focussing is never modified, so that only one colour filter need be available whose position can also remain unaltered. The front objective can, without any difficulty, be focussed as in a normal taking camera and may also be exchanged. Care should only be taken that the aperture of the front objective is in accordance with the front aperture of the second objective.

If between the two layers, there is no diffusing surface, the two objectives must not be affected by cat-eye effects in order to avoid colour dominants. If, however, use is made of a diffusing surface it is only necessary to avoid cat-eye effects in the second objective. The aperture of the first objective can then also be decreased in order to increase the sharpness of depth effects or for another reason, for instance with the aid of the iris diaphragm 23.

The imaging ratio of the second objective is fixed. It may for instance be 1:1. Preferably this objective should, however, be such that it decreases the real image projected by the front objective. For, if the reduction ratio 3:1 is adopted, the aperture of the front objective may be 1/7.5, if, for instance, that of the rear objective is 1/2.5. If use is made of a diffusing surface the aperture of the front objective can also be made larger so as to compensate for the loss in light occurring on that surface. If, in the example indicated above where the reduction ratio is 3:1 and the rear objective aperture 1/2.5, the front objective has also imparted to it an aperture of about 1/3 to 1/2.5, it is possible to obtain for the image on the film approximately the same brightness as in the case of direct taking by means of an objective having the aperture 1/2.5.

The advantages of the invention are also evident in projecting apparatus, more particularly if moving filters are used, since the focussing is then also considerably facilitated and it is possible to construct that part of the objective, which fulfils the most important conditions imposed by the lenticulated film, uniformly for all apparatus and only the front part of the objective need be adapted to the conditions of the cinemas under consideration.

I claim as my invention:

1. An optical system for colored photography comprising a primary objective and a secondary objective, means between said objectives adapted to project a real image formed by one of said objectives through the other of said objectives, means to separate said real image into color components, a lenticulated film on the other side of said rear objective from said means, and a color screen associated with said rear objective.

2. An optical system for colored photography comprising a primary objective and a secondary objective, a lenticulated grid disposed between said objectives in the position of a real image formed by one of said objectives, means to project said image through the other of said objectives, a lenticulated film on the other side of said rear objective from said grid, and a color screen associated with said rear objective.

3. An optical system for colored photography comprising a primary objective and a secondary objective, a lenticulated grid disposed between said objectives in the position of a real image formed by one of said objectives, means to project said image through the other of said objectives, a lenticulated film on the other side of said rear objective from said grid, a color screen associated with said rear objective, and a second lenticulated grid closely adjacent said first-named grid and having as many lenticulations per lenticulation on the first-named grid as there are color zones in the color filter.

4. An optical system for colored photography comprising a primary objective of relatively small aperture and a secondary objective of relatively large aperture, means between said objectives adapted to project a real image formed by one of said objectives through the other objective, a lenticulated film on the other side of said secondary objective from said means, said film having its lenticulations facing said secondary objective, and a color filter associated with said secondary objective and adapted to project said image in its component colors, each lenticulation on said film having an aperture cooperating with the aperture of said secondary objective to form an image of the filter on said film when light passes through the filter to the film.

5. An optical system for colored photography comprising a primary objective of relatively small aperture and a secondary objective of relatively large aperture, a light diffusing surface between said objectives and adapted to receive a real image formed by one of them, means to project said real image to the other of said objectives, a lenticulated film on the other side of said secondary objective from said means, said film having its lenticulations facing said secondary objective, and a color filter associated with said secondary objective and adapted to project said image in its component colors, each lenticulation on said film having an aperture cooperating with the aperture of said secondary objective to form an image of the filter on said film when light passes through the filter to the film.

6. An optical system for colored photography comprising a primary objective of relatively small aperture and a secondary objective of relatively large aperture, a light diffusing surface between said objectives and adapted to receive a real image formed by one of them, means to project said real image to the other of said objectives, means to separate said real image into color components, a lenticulated film on the other side of said secondary objective from said means, said film having its lenticulations facing said secondary objective, and a color filter associated with said secondary objective and adapted to project said image in its component colors, each lenticulation on said film having an aperture cooperating with the aperture of said secondary objective to form an image of the filter on said film when light passes through the filter to the film.

KURT RÄNTSCH.